(12) United States Patent  
Blazer

(10) Patent No.: US 7,187,830 B2
(45) Date of Patent: Mar. 6, 2007

(54) OPTICAL FIBER RIBBONS HAVING A PREFERENTIAL TEAR PORTION FORMED BY CURING AND METHODS THEREFOR

(75) Inventor: Bradley J. Blazer, Granite Falls, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 134 days.

(21) Appl. No.: 11/020,777

(22) Filed: Dec. 22, 2004

(65) Prior Publication Data

US 2006/0133749 A1 Jun. 22, 2006

(51) Int. Cl.
G02B 6/06 (2006.01)
B05D 5/06 (2006.01)

(52) U.S. Cl. ............... 385/114; 385/100; 385/141; 427/163.1

(58) Field of Classification Search ........... 385/114, 385/115, 116, 141, 142, 143, 144, 100; 427/163.1
See application file for complete search history.

(56) References Cited

U.S. PATENT DOCUMENTS

| 5,312,570 | A | 5/1994 | Halter ................. 264/1.5 |
| 5,982,968 | A | 11/1999 | Stulpin ................ 385/114 |
| 6,028,976 | A | 2/2000 | Sato et al. ............ 385/114 |
| 6,134,364 | A | 10/2000 | DeFabritis et al. ..... 385/114 |
| 6,160,941 | A | 12/2000 | Yang .................. 385/114 |
| 6,222,969 | B1 * | 4/2001 | Botelho et al. ........ 385/114 |
| 6,246,824 | B1 | 6/2001 | Vandeberg et al. ..... 385/129 |
| 6,337,941 | B1 | 1/2002 | Yang et al. ........... 385/114 |
| 6,483,972 | B1 | 11/2002 | Thompson et al. ...... 385/114 |
| 6,628,866 | B1 | 9/2003 | Wilson et al. ......... 385/114 |
| 6,748,148 | B2 | 6/2004 | Chiasson et al. ....... 385/114 |
| 6,792,184 | B2 | 9/2004 | Conrad et al. ......... 385/114 |
| 2003/0223713 | A1 * | 12/2003 | Chiasson et al. ....... 385/114 |
| 2004/0170364 | A1 | 9/2004 | Chiasson et al. |
| 2004/0223709 | A1 | 11/2004 | Conrad et al. |
| 2006/0045443 | A1 * | 3/2006 | Blazer ................. 385/114 |

FOREIGN PATENT DOCUMENTS

| JP | 1-138517 | 5/1989 |
| JP | 1-138519 | 5/1989 |
| JP | 1-150106 | 6/1989 |

* cited by examiner

Primary Examiner—Brian M. Healy

(57) ABSTRACT

An optical fiber ribbon having a plurality of optical fibers connected by a radiation curable matrix and a method of manufacturing the same are disclosed. The optical fiber ribbon includes at least one preferential tear portion formed by a weakened portion in the matrix, the weakened portion of the matrix having a reduced cure level compared with the surrounding matrix material, thereby creating the weakened portion. In another embodiment, the optical fiber ribbon is formed of two subunits each having a plurality of optical fibers, wherein the subunits are connected by a secondary matrix.

26 Claims, 4 Drawing Sheets

OPTICAL FIBER RIBBONS HAVING A PREFERENTIAL TEAR PORTION FORMED BY CURING AND METHODS THEREFOR

FIELD OF THE INVENTION

The present invention relates generally to optical fiber ribbons having a preferential tear portion for splitting the ribbon into subsets or subunits. More specifically, the present invention relates to optical fiber ribbons where the preferential tear portion is formed by varying the ribbon cure.

BACKGROUND OF THE INVENTION

Fiber optic ribbons include optical waveguides such as optical fibers that transmit optical signals, for example, voice, video, and/or data information. Fiber optic cables using optical fiber ribbons can result in a relatively high optical fiber-density. Fiber optic ribbon configurations can be generally classified into two general categories. Namely, fiber optic ribbons with subunits and those without. A fiber optic ribbon with a subunit configuration, for example, includes at least one optical fiber surrounded by a discrete primary matrix, thereby forming a first subunit, and a second subunit having a similar construction with its own primary matrix. Then, the two subunits are connected and/or encapsulated by a secondary matrix, thereby forming a larger ribbon. On the other hand, fiber optic ribbons without subunits generally have a plurality of optical fibers surrounded by a single layer of matrix material.

Fiber optic ribbons are splicable using mass fusion techniques that can save the craftsman time when making optical connections. Nonetheless, the craftsman may have to splice less than every fiber in a ribbon and/or connect fibers from one ribbon to several different ribbons. Consequently, the craftsman may have to separate a ribbon into subsets or subgroups of fibers for connectorization. Optical fiber ribbons without subunits can present problems for the craft when attempting separation into subgroups of optical fibers. For example, when separating these optical fiber ribbons into optical fiber subsets, the craft may use expensive precision tools. Where the craft elects to separate the optical fiber ribbon into subsets by hand, or with a tool lacking adequate precision, stray optical fibers and/or damage to the optical fibers can result. Stray optical fibers can cause problems in optical ribbon connectorization, organization, stripping, and splicing. Additionally, damage to the optical fibers is undesirable and can render the optical fiber inoperable for its intended purpose.

There are fiber optic ribbon configurations that attempt to aid the separation of fiber optic ribbons into subsets without using subunits. For example, U.S. Pat. No. 5,982,968 requires an optical fiber ribbon of uniform thickness having V-shaped stress-concentrations in the matrix material that extend along the longitudinal axis of the fiber optic ribbon. V-shaped stress-concentrations can be located across from each other on the planar surfaces of the fiber optic ribbon, thereby aiding the separation of the fiber optic ribbon into subsets. However, the '968 patent requires a wider fiber optic ribbon because additional matrix material is required adjacent to the optical fibers near the V-shaped stress-concentrations to avoid stray optical fibers after separation. A wider ribbon requires more matrix material and decreases the optical fiber density.

Another example of a separable fiber optic ribbon is described in U.S. Pat. No. 5,970,196. More specifically, the '196 patent requires a pair of removable sections positioned in V-shaped notches located across from each other on opposite sides of the planar surfaces of an optical fiber ribbon. The removable sections are positioned between adjacent interior optical fibers of the optical fiber ribbon to facilitate the separation of the optical fiber ribbon into subsets at the V-shaped notches. The removable sections can either be flush with the planar surfaces of the optical fiber ribbon, or they may protrude therefrom. These known fiber optic ribbons have several disadvantages. For example, they can be more expensive and difficult to manufacture due to the required tooling and the like. Additionally; from an operability standpoint, the V-shaped stress-concentrations and/or V-shaped notches can undesirably affect the robustness of the optical fiber ribbon and/or induce microbending in the optical fibers.

Fiber optic ribbons that employ subunits to aid separation generally do not encounter these problems; however, they can have other problems. A conventional optical fiber ribbon 1 employing subunits encapsulated in a secondary matrix is shown in FIG. 1. Optical fiber ribbons having subunits can have several advantages, for example, improved separation, and avoidance of stray fiber occurrences. In particular, optical fiber ribbon 1 includes a pair of conventional subunits 2 having optical fibers 3 encapsulated in a primary matrix 5, which are then encapsulated in a secondary matrix 4. However, conventional optical fiber ribbon 1 has disadvantages. For example, one concern is the potential formation of wings W (FIG. 1) during hand separation of subunits 2. Wings W can be cause by, for example, a lack of sufficient adhesion between secondary matrix 4 and subunit matrix 5 and/or random fracturing of the secondary matrix during separation. The existence of wings W can negatively affect, for example, optical ribbon organization, connectorization, stripping, and/or splicing operations by the craft. Additionally, wings W can cause problems with ribbon identification markings, or compatibility of the subunit with ribbon handling tools, for example, thermal strippers, splice chucks, and fusion splicers.

Accordingly, the present invention is directed to fiber optic ribbon designs that substantially obviates one or more of the problems and disadvantages of the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

DETAILED DESCRIPTION OF THE INVENTION

Figure 1:
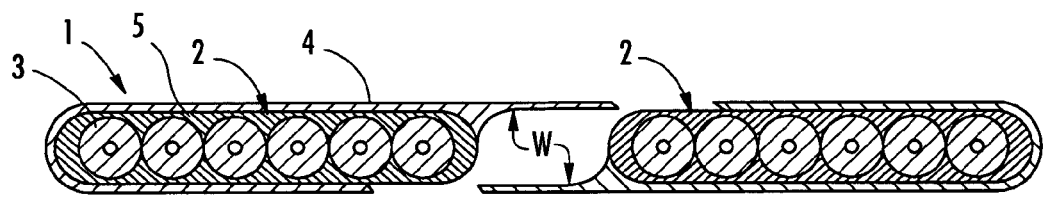
FIG. 1 is a cross-sectional view of a conventional optical fiber ribbon according to the background of the present invention.
Figure 2:
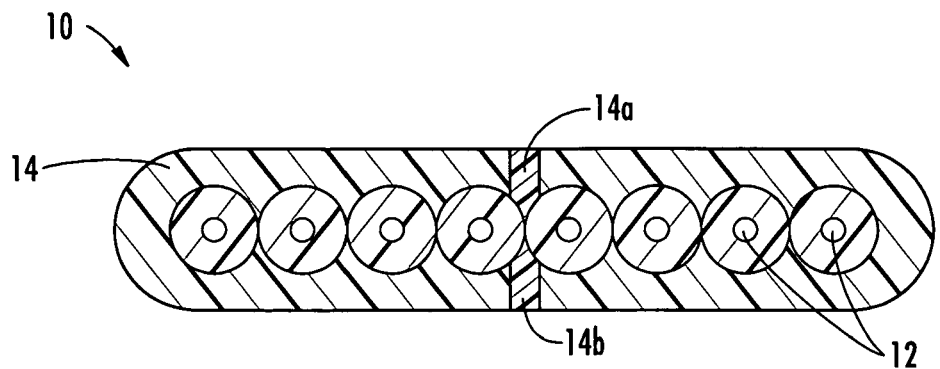
FIG. 2 is a cross-sectional view of a fiber optic ribbon according to one embodiment of the present invention.

FIG. 2 depicts a cross-sectional view of an exemplary optical fiber ribbon 10 (hereinafter ribbon) according to the present invention. Ribbon 10 includes a plurality of optical fibers 12 and a matrix 14 that connects the plurality of optical fibers together in an elongate ribbon structure. Matrix 14 is a radiation curable material that includes a plurality of preferential tear portions 14a, 14b. Preferential tear portions 14a, 14b are weakened portions of matrix 14 formed by having a reduced cure compared with the surrounding matrix material. In other words, portions of matrix 14 have different degrees of curing, thereby forming one or more preferential tear portions for influencing the fracture initiation when splitting the ribbon. Consequently, during separation of ribbon 10 into subsets of optical fibers the fracture and separation of matrix 14 will advantageously occur at, or near, preferential tear portions 14a, 14b. In this case, preferential tear portions are positioned on opposing planar sides of ribbon 10 for splitting the eight fiber ribbon into two subsets of four optical fibers. Preferential tear portions 14a, 14b are formed by influencing the radiation intensity during curing of matrix 14 along the ribbon using, for instance, a filter, but other suitable methods are possible.

Of course, ribbon of the present invention can also be used as a stand-alone ribbon, a portion of a ribbon stack, or as a subunit of a larger ribbon. Likewise, ribbons of the present invention are also suitable for use in larger assemblies like cables or tube assemblies. Ribbon 10 is depicted as a generally planar configuration, thereby eliminating the need for special tooling for creating stress-concentrations as with the prior art. Matrix 14 generally contacts optical fibers 12 and encapsulates the same, thereby providing a robust structure for processing and handling. Other suitable configurations such a circular or round are also possible along with the use of the concepts with ribbons having stress-concentrations. Furthermore, the concepts of the present invention can include other ribbon cross-sections where the preferential tear portion changes from a first location to a second location along the length of the ribbon, thereby making it separable into different subsets.

In one embodiment, optical fibers 12 are a plurality of single-mode optical fibers; however, other types or configurations of optical fibers can be used. For example, optical fibers 12 can be multi-mode, pure-mode, erbium doped, polarization-maintaining fiber, plastic, other suitable types of light waveguides, and/or combinations thereof. By way of example, each optical fiber 12 can include a silica-based core that is operative to transmit light and is surrounded by a silica-based cladding having a lower index of refraction than the core. Additionally, one or more coatings can be applied to optical fiber 12. For instance, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. Suitable optical fibers are commercially available from Corning Incorporated of Corning, N.Y.

Matrix 14 is a radiation curable material; however, other suitable materials where the curing can vary may also employ the concepts of the invention. An example of a suitable radiation curable material is a polyurethane acrylate resin commercially available from DSM Desotech Inc. of Elgin Ill. such as 950-706. Alternatively, other suitable UV materials can be used, for example, polyester acrylate resin commercially available from Borden Chemical, Inc. of Columbus, Ohio.

As known to one skilled in the art, radiation curable materials undergo a transition from a liquid to a solid when irradiated with predetermined radiation wavelengths. Before curing, the radiation curable material includes a mixture of formulations of, for example, liquid monomers, oligomer "backbones" with acrylate functional groups, photoinitiators, and other additives. Typical photoinitiators function by: absorbing energy radiated by the radiation source; fragmenting into reactive species; and then initiating a polymerization/hardening reaction of the monomers and oligomers. Generally, as a result of irradiation, a cured solid network of cross-linking is formed between the monomers and oligomers, which may include fugitive components. Stated another way, the photoinitiator begins a chemical reaction that promotes the solidification of the liquid matrix into a generally solid film having modulus characteristics.

One aspect of the curing process is the reaction of a photoinitiator in response to radiation exposure. A photoinitiator has an inherent absorption spectrum that is measured in terms of absorbance as a function of radiation wavelength. Each photoinitiator has a characteristic photoactive region, i.e., a photoactive wavelength range typically measured in nanometers (nm). For example, commercially available photoinitiators can have a photoactive wavelength range in the vacuum ultra-violet (160–220 nm), ultra-violet (220–400 nm), or visible light (400–700 nm) wavelength ranges.

The resulting strength, i.e., the failure stress of the radiation curable materials can be controlled by factors such as radiation intensity and cure time. The radiation dose, i.e., the radiant energy arriving at a surface per unit area is inversely proportional to the line speed, i.e., the radiation dose is the integral of radiated power as a function of time. Because adjacent portions of the ribbon run past the radiation source at a uniform speed generally speaking they receive the radiation dose for the same period of time. However, the present invention changes the intensity received at different portions of the ribbon by varying the intensity of the radiation dose by using, for instance, a filter. For instance, the filter creates preferential tear portions 14a, 14b having a width of about 250 microns or less adjacent to optical fibers 12 where the intended separation is to occur. Thus, preferential tear portions 14a, 14b have mechanical characteristics that are influenced by exposure to a lesser intensity of radiation compared with other areas of matrix 14.

In other words, the preferential tear portions 14a, 14b have a relatively low cross-link density of cured material compared with the relatively high cross-link density in the rest of matrix 14. Thus, the radiation cured materials can have a failure stress that varies. By way of example, the ribbon failure stress might vary from about 1.5 MPa to about 3.5 MPa depending on the radiation dose received during curing. As used herein, failure stress means the measuring of the tensile and/or shear stress in the material at its failure point. Consequently, a failure stress ratio can be established between preferential tear portions 14a, 14b and other adjacent portions of matrix 14. A failure stress ratio is preferably in the range of about 0.9 to about 0.1, more preferably about 0.8 to about 0.2, and most preferably about 0.7 to about 0.5, but the ratio is selected for its suitability to the application.

Figure 3:
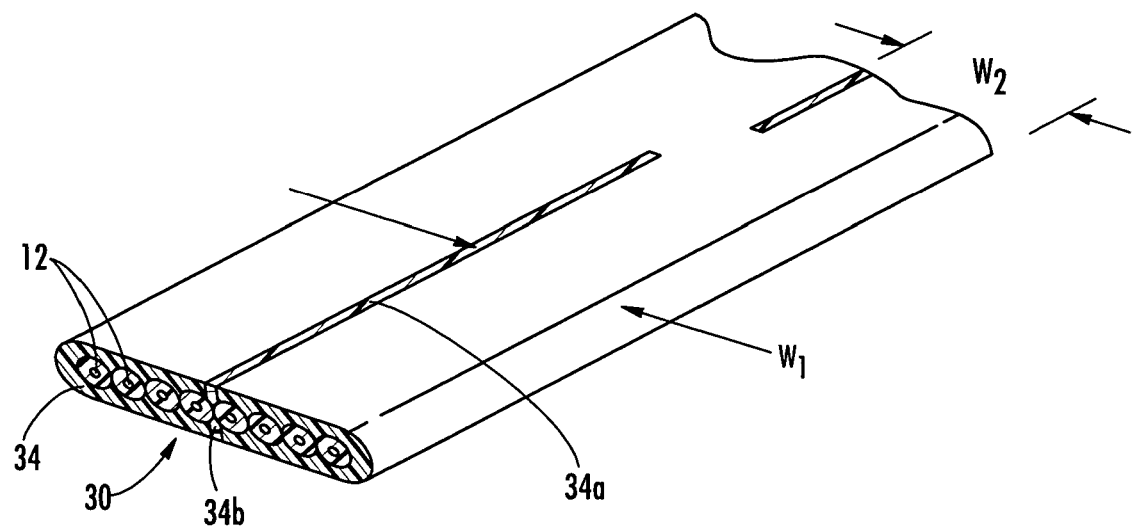
FIG. 3 is a perspective view of another fiber optic ribbon according to another embodiment of the present invention.

FIG. 3 illustrates a perspective view of ribbon 30 another embodiment according to the present invention. Ribbon 30 includes a plurality of optical waveguides 12 arranged in a generally planar configuration with a matrix 34 forming an elongate structure. Matrix 34 includes a plurality of preferential tear portions 34a,34b that shift from a first location adjacent to a first pair of optical fibers to a second location adjacent to a second pair of optical fibers. Thus, ribbon 30 can have areas that split into different configurations along its length. By way of example, preferential tear portions are first configured to allow splitting of an eight fiber ribbon into two subsets of four optical fibers at the first location $W_1$ and then configured to allow splitting into subsets of two and six optical fibers at a second location $W_2$. This change in location of the preferential tear portions can be performed in process while the ribbon is being cured by quickly shifting the filter.

Figure 4:
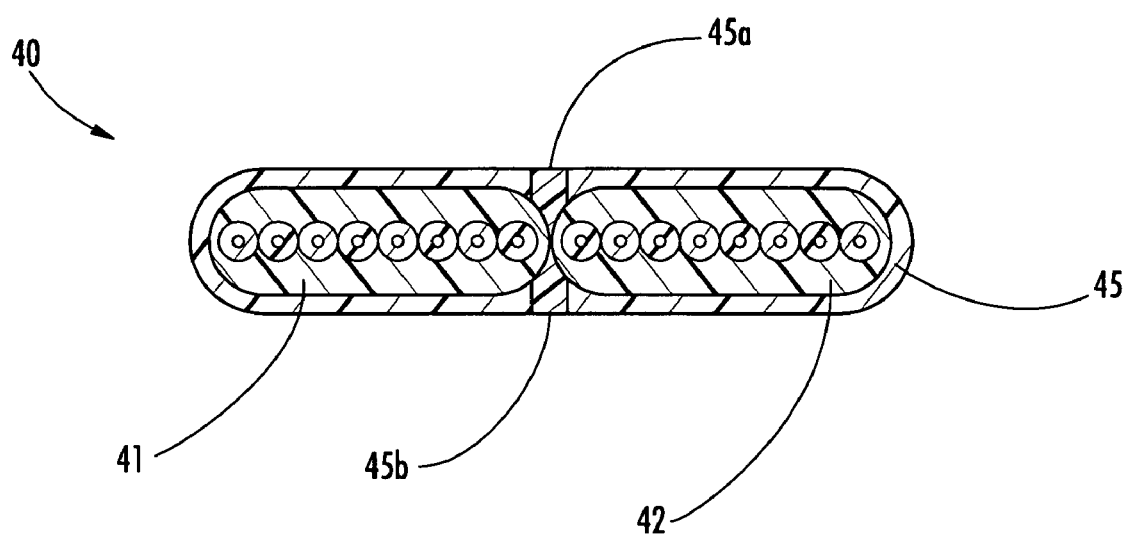
FIG. 4 is a cross-sectional view of another embodiment according to the present invention.

FIG. 4 depicts a ribbon 40 according to another embodiment of the present invention. Ribbon 40 includes two ribbons such as ribbon 10 for use as a first subunit 41 and a second subunit 42 connected by a secondary matrix 45. As used herein, subunit means a plurality of optical fibers having a discrete matrix material thereon. In other words, each subunit 41,42 has its own individual primary matrix (not numbered) material thereon. Subunits should not be confused with subsets, which are optical fibers arranged as groups separated, or intend to be separated, from a common matrix material. When subunits are separated the discrete primary matrix material generally remains intact on each subunit. However, ribbons according to the present invention can use other suitable types or numbers of ribbons as subunits. Likewise, preferential tear portions may occur in the individual subunits, the secondary matrix, or combination thereof. As shown, ribbon 40 also includes preferential tear portions 45a,45b for aiding in the separation of ribbon 40 into subunits 41,42.

Secondary matrix 45 contacts and connects portions of subunits 41,42 and is preferably configured to provide a pair of opposing generally flat planar surfaces 46. Secondary matrix 45 can have material characteristics that are similar or different than primary matrix of-subunits 41,42. The generally flat planar surfaces 46 allow ribbon 40 to be easily stacked to form a portion of a ribbon stack. However, other suitable shapes of secondary matrix 45 can be used. In this case, preferential tear portions 45a,45b are disposed for separating subunits 41,42.

Additionally, ribbon 40 advantageously inhibits the formation of, for example, wings and/or stray optical fibers during separation. Ribbon 40 inhibits the formation of wings by having a preferential tear portions in secondary matrix 45, rather than allowing random fracturing in secondary matrix 45. Likewise, the concepts of the present invention are applicable with variations using geometry for preferential tear portions. Simply stated, embodiments of the present invention can use both geometric constructions along with variable curing to create preferential tear portions in optical fiber ribbons.

Figure 5:
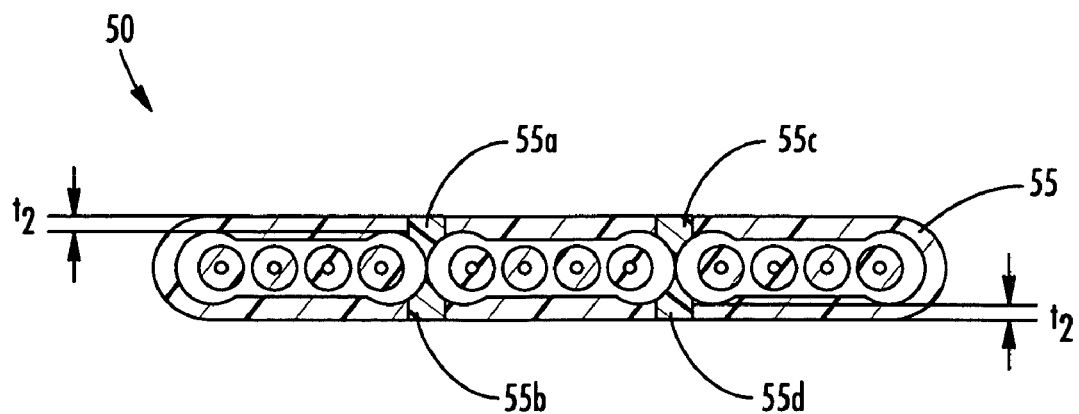
FIG. 5 is another cross-sectional view of a further embodiment according to the present invention.

Specifically, FIG. 5 shows ribbon 50 having a plurality of preferential tear portions 55a–55d generally located at a point of local minimum thickness t2 generally adjacent to an interface of subunits 51,52 and 52,53. In this case, the local minimum thickness t2 is formed in secondary matrix 55 by subunits 51,52 having non-uniform cross-sections. In other words, subunits 51,52,53 have bulbous ends that create the local minimum thickness adjacent to preferential tear portion having a reduced cure level compared with the surrounding matrix material. When secondary matrix 55 with generally flat planar surfaces 56 is applied over these non-uniform cross-sections, the thickness of secondary matrix 55 varies at the bulbous ends, thereby creating a preferential tear portion using both geometry and cure intensity. For example, local minimum thickness t2 is about 2 µm, whereas portions of the secondary matrix 55 over the medial portions of subunits 51,52 have a thickness of about 10 µm. In other embodiments, local minimum thickness t2 can approach a value of essentially zero. In other words, subunits 51,52,53 have bulbous ends that create the local minimum thickness. The local minimum thickness can have other suitable dimensions or locations, but should allow the ribbon to have a suitable robustness and handleability. In other embodiments, preferential tear portion is caused by using geometry, radiation intensity, or both, thereby allowing the fracture of secondary matrix 55 to begin and/or terminate at these points. For instance, the concepts of the present invention are combinable with discontinuities such notches or voids in the ribbon matrix, and/or using two different materials with different material characteristics.

Additionally, the secondary matrix may also provide material characteristics that are different from primary matrix of the subunits such as adhesion, COF characteristics, or hardness. This can be accomplished, for example, by using a secondary matrix material that is similar to the primary matrix with different processing characteristics such as cure characteristics, or by using a material that is different than the primary matrix. Likewise, different portions of secondary matrix can be different materials and/or have distinct material characteristics.

Illustratively, a first planar surface of secondary matrix 55 can have a predetermined COF while having a high adhesion to the primary matrices. A predetermined COF on the planar surface allows the ribbon to relieve strain, for example, during bending of a stack of ribbons. While a high adhesion characteristic between the primary and secondary matrices can make for a generally robust ribbon. Additionally, as disclosed in U.S. Pat. No. 6,253,013, which is incorporated in its entirety herein by reference, an adhesion zone (not shown) can be used between the primary matrix and secondary matrix. For example, the adhesion zone is applied to the primary matrix using a Corona discharge treatment. Additionally, a marking indicia for identifying ribbons can be printed either on the primary matrix and/or the secondary matrix. In other embodiments, the secondary matrix can be used to identify ribbon. For example, the secondary matrix can be colored with a dye for identification of the ribbon.

Figure 6:
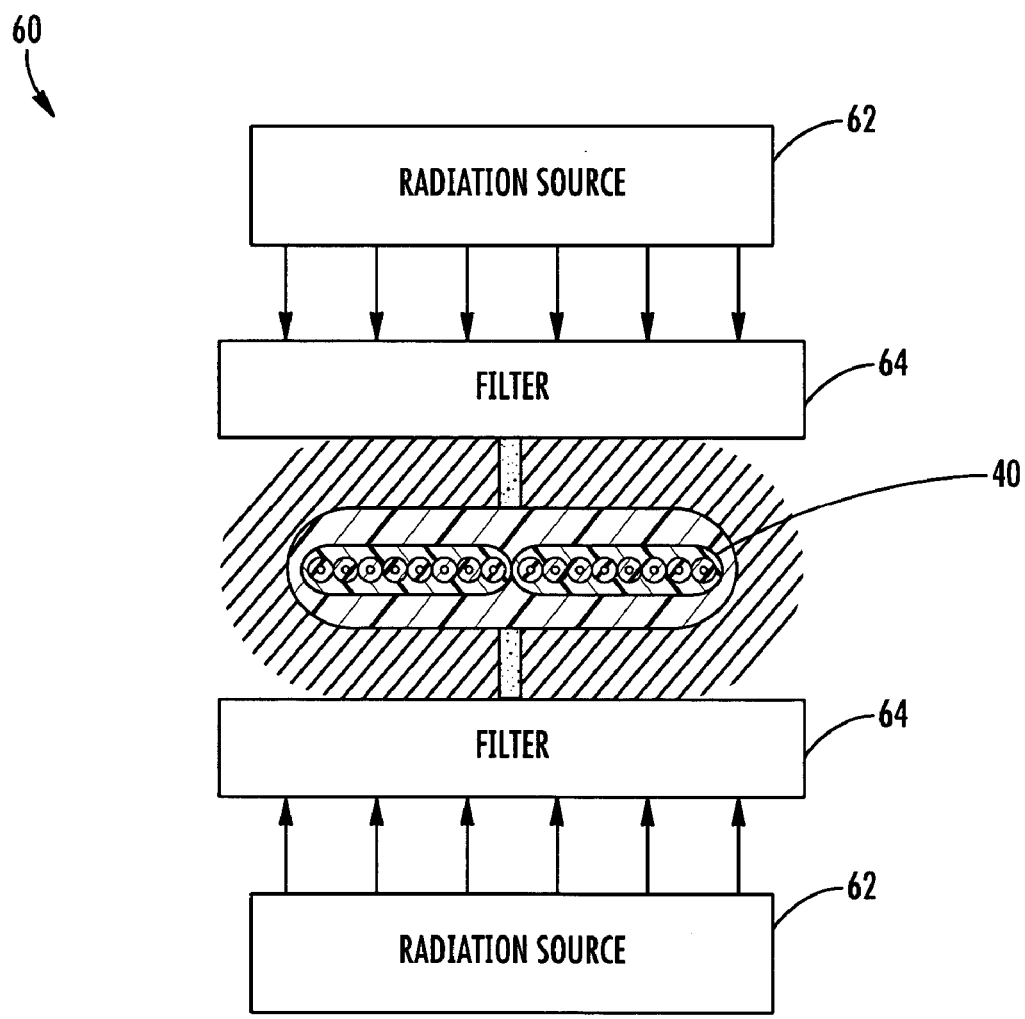
FIG. 6 is a schematic representation of an exemplary manufacturing method for fiber optic ribbons according to the present invention.

FIG. 6 is a schematic representation depicting an exemplary curing arrangement 60 according to the present invention. Curing arrangement 60 includes at least one radiation source 62 and at least one filter 64 for influencing the degree of cure that various portions of the ribbon receive. Radiation sources 62 provides radiation for curing the matrix and filters 64 are used to influence the intensity of the radiation exposure and thus the mechanical characteristics that the ribbon experiences. In this representation, curing arrangement 60 has two respective radiation sources 62 and filters 64 for collimating the radiation and providing the desired location, size, and shape to the preferential tear portions. Of course, other suitable curing arrangements are possible with the concepts of the present invention. For instance, simple curing arrangements such as producing shadows with elements that block the radiation to complex arrangements such as an actively controlled laser capable of producing any continuous or discontinuous patterns are possible with the inventive concepts disclosed herein. Another possible method of manufacture is the application of an ink or other suitable material on the uncured matrix material that partially blocks the absorption of radiation on the matrix where the preferential tear portion is desired. In other words, an stripe of material that attenuates the radiation can create the preferential tear portion. For instance, the ink or other suitable material is applied using an ink jet head before the ribbon is cured.

Many modifications and other embodiments of the present invention, within the scope of the appended claims, will become apparent to a skilled artisan. For example, the optical fiber ribbons of the present invention can have other configurations such as different numbers of optical fibers or subunits. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

That which is claimed:

1. An optical fiber ribbon comprising:
   a plurality of optical fibers, each optical fiber of the plurality of optical fibers having a core, a cladding, the cladding surrounding the core, and at least one coating, the at least one coating surrounding the cladding;
   a matrix being a radiation curable material, the matrix connecting the plurality of optical fibers, thereby forming the optical fiber ribbon, wherein the optical fiber ribbon includes at least one preferential tear portion formed by a weakened portion in the matrix, the weakened portion of the matrix having a reduced cure level compared with the surrounding matrix material, thereby creating the weakened portion.

2. The optical fiber ribbon of claim 1, the at least one preferential tear portion having a width that is about 250 microns or less.

3. The optical fiber ribbon of claim 1, further comprising a first ribbon subunit and a second ribbon subunit, wherein the first and second ribbon subunits are connected together by a secondary matrix, and the preferential tear portion is disposed within the secondary matrix.

4. The optical fiber ribbon of claim 3, the first ribbon subunit having the same number of optical fibers as the second ribbon subunit.

5. The optical fiber ribton of claim 3, one of the first and second ribbon subunits having a bulbous end portion, thereby creating a local minimum thickness of the secondary matrix.

6. The optical fiber ribbon of claim 1, further comprising a second preferential tear portion formed by a weakened portion in the matrix, the second preferetitial tear portion being located to cooperate with the at least one preferential tear portion so that the optical fiber ribbon is separable.

7. The optical fiber ribbon of claim 1, the cross-section of the optical fiber ribbon generally having a uniform thickness.

8. The optical fiber ribbon of claim 1, wherein the preferential tear portion of the ribbon changes from a first location along the length of the optical fiber ribbon to a second location along the length of the optical fiber ribbon so that the optical fiber ribbon is separable into a different configuration at first location compared with the second location.

9. The optical fiber ribbon of claim 1, wherein the optical fiber ribbon is a subunit of a larger fiber optic ribbon.

10. The optical fiber ribbon of claim 1, the matrix having a failure stress ratio between the at least one preferential tear portion and the surrounding matrix material, the failure stress ratio being about 0.9 or less.

11. An optical fiber ribbon comprising:
    a first subunit, the first subunit having a plurality of optical fibers, the first plurality of optical fibers being connected by a first primary matrix;
    a second subunit, the second subunit having a plurality of optical fibers, the second plurality of optical fibers being connected by a second primary matrix; and
    a secondary matrix formed from a radiation curable material, the secondary matrix connecting the first subunit and the second subunit together, thereby forming the optical fiber ribbon, wherein the secondary matrix of the optical fiber ribbon includes at least one preferential tear portion formed by a weakened portion in the matrix, the weakened portion of the matrix having a reduced cure level compared with the surrounding matrix material, thereby creating the weakened portion.

12. The optical fiber ribbon of claim 11, the at least one preferential tear portion having a width that is about 250 microns or less.

13. The optical fiber ribbon of claim 11, the first subunit having the same nuaiber of optical fibers as the second subunit.

14. The optical fiber ribbon of claim 11, further comprising a second preferential tear portion formed by a second weakened portion in the secondary matrix, the second preferential tear portion being located to cooperate with the at least one preferential tear portion so that the optical fiber ribbon is separable.

15. The optical fiber ribbon of claim 11, one of the first and second subunits having a bulbous end portion, thereby creating a local minimum thickness in the secondary matrix.

16. The optical fiber ribbon of claim 11, the cross-section of the optical fiber ribbon generally having a uniform thickness.

17. The optical fiber ribbbn of claim 11, wherein the preferential tear portion of the ribbon changes from a first location along the length of the optical fiber ribbon to a second location along the length of the optical fiber ribbon so that the optical fiber ribbon is separable into a different configuration at first location compared with the second location.

18. The optical fiber ribbon of claim 11, the secondary matrix having a failure stress ratio between the at least one preferential tear portion and the surrounding matrix material, the failure stress ratio being about 0.9 or less.

19. A method of manufacturing an optical fiber ribbon comprising the steps of:
    paying off a plurality of optical fibers;
    aligning the plurality of optical fibers;
    coating the plurality of optical fiber with a radiation curable matrix; and
    curing the plurality of optical fibers by irradiating the coating, wherein the curing produces at least one weakened portion of the radiation curable matrix material that forms a preferential tear portion, the weakened portion of the radiation curable matrix having a reduced cure level compared with the surrounding matrix material, thereby creating the at least one weakened portion.

20. The method of claim 19, the weakened portion of the radiation curable matrix material formed using a filter to reduce the cure intensity at the preferential tear portion.

21. The method of claim 19, the at least one preferential tear portion having a width that is about 250 microns or less.

22. The method of claim 19, the step of coating being the coating of a secondary matrix for connecting a first ribbon subunit and a second ribbon subunit, wherein the preferential tear portion is disposed within the secondary matrix.

23. The optical fiber ribbon of claim 22, one of the first and second ribbon subunits having a bulbous end portion, thereby creating a local, minimum thickness of the secondary matrix.

24. The method of claim 22, the first ribbon subunit having the same number of optical fibers as the second ribbon subunit.

25. The method of claim 19, the step of curing forming a second preferential tear portion.

26. The method of claim 19, further comprising the step of changing the position of the preferential tear portion from a first location on the optical fiber ribbon to a second location on the optical fiber ribbon so that the optical fiber ribbon is separable into a different configurations at first location compared with the second location.

* * * * *